(12) United States Patent
Zhang et al.

(10) Patent No.: US 12,513,296 B2
(45) Date of Patent: Dec. 30, 2025

(54) POINT CLOUD ENCODING METHOD AND APPARATUS, POINT CLOUD DECODING METHOD AND APPARATUS, AND COMMUNICATION DEVICE

(71) Applicant: VIVO MOBILE COMMUNICATION CO., LTD., Guangdong (CN)

(72) Inventors: Wei Zhang, Guangdong (CN); Fuzheng Yang, Guangdong (CN); Jingyun Lu, Guangdong (CN); Zhuoyi Lv, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/731,928

(22) Filed: Jun. 3, 2024

(65) Prior Publication Data

US 2024/0323384 A1    Sep. 26, 2024

Related U.S. Application Data

(63) Continuation of application No. PCT/CN2022/135920, filed on Dec. 1, 2022.

(30) Foreign Application Priority Data

Dec. 3, 2021 (CN) .......................... 202111466396.5

(51) Int. Cl.
*H04N 19/13* (2014.01)
*H04N 19/124* (2014.01)
(Continued)

(52) U.S. Cl.
CPC ........... *H04N 19/13* (2014.11); *H04N 19/124* (2014.11); *H04N 19/597* (2014.11); *H04N 19/93* (2014.11)

(58) Field of Classification Search
CPC .... H04N 19/93; H04N 19/597; H04N 19/124; H04N 19/13
See application file for complete search history.

(56) References Cited

U.S. PATENT DOCUMENTS

2017/0347122 A1    11/2017    Chou et al.
2021/0209813 A1    7/2021    Hur et al.
(Continued)

FOREIGN PATENT DOCUMENTS

CN    111247798 A    6/2020
CN    112352431 A    2/2021
(Continued)

OTHER PUBLICATIONS

First Office Action for Chinese Application No. 202111466396.5, dated Apr. 10, 2025, 21 Pages.
(Continued)

*Primary Examiner* — On S Mung
(74) *Attorney, Agent, or Firm* — BROOKS KUSHMAN P.C.

(57) ABSTRACT

A point cloud encoding and decoding method and apparatus, and pertains to the field of point cloud processing technologies. The point cloud encoding method in embodiments of this application includes: An encoder determines, based on attribute information of target point cloud, a target attribute information distribution characteristic value corresponding to a target bit rate point, where the target bit rate point is a bit rate point corresponding to an attribute quantization step of the attribute information; the encoder determines a target run-length encoding manner based on the target attribute information distribution characteristic value; and the encoder performs encoding processing on the attribute information based on the target run-length encoding manner.

17 Claims, 4 Drawing Sheets

(51) Int. Cl.
*H04N 19/597* (2014.01)
*H04N 19/93* (2014.01)

(56) References Cited

U.S. PATENT DOCUMENTS

| | | |
|---|---|---|
| 2021/0319593 A1 | 10/2021 | Flynn |
| 2021/0335016 A1 | 10/2021 | Li et al. |
| 2022/0222861 A1 | 7/2022 | Yu et al. |

FOREIGN PATENT DOCUMENTS

| | | |
|---|---|---|
| CN | 112565734 A | 3/2021 |
| WO | 2020246689 A1 | 12/2020 |
| WO | 2021205068 A1 | 10/2021 |
| WO | 2023184196 A1 | 10/2023 |

OTHER PUBLICATIONS

Extended European Search Report for Application No. 22900624.2, dated Feb. 26, 2025, 12 Pages.
International Search Report and Written Opinion for Application No. PCT/CN2022/135920, dated Jan. 28, 2023, 15 Pages.

POINT CLOUD ENCODING METHOD AND APPARATUS, POINT CLOUD DECODING METHOD AND APPARATUS, AND COMMUNICATION DEVICE

CROSS-REFERENCE TO RELATED APPLICATIONS

This application is a continuation of International Application No. PCT/CN2022/135920 filed on Dec. 1, 2022, which claims priority to Chinese Patent Application No. 202111466396.5 filed on Dec. 3, 2021, which are incorporated herein by reference in their entireties.

TECHNICAL FIELD

This application pertains to the field of point cloud processing technologies, and specifically relates to a point cloud encoding method, a point cloud encoding apparatus, a point cloud decoding method, a point cloud decoding apparatus, and a communication device.

BACKGROUND

In an existing point cloud compression (Point Cloud Compression, PCC) attribute entropy encoding process of a digital audio video coding and decoding technology standard (Audio Video coding Standard, AVS), run-length encoding needs to be used first to perform entropy encoding. In currently used run-length encoding, a same run-length encoding manner is used for different bit rate points, and this causes low encoding efficiency.

SUMMARY

Embodiments of this application provide a point cloud encoding method, a point cloud encoding apparatus, a point cloud decoding method, a point cloud decoding apparatus, and a communication device, which can resolve a problem of low encoding efficiency in an existing solution.

According to a first aspect, a point cloud encoding method is provided, including:
  determining, by an encoder based on attribute information of target point cloud, a target attribute information distribution characteristic value corresponding to a target bit rate point, where the target bit rate point is a bit rate point corresponding to an attribute quantization step of the attribute information;
  determining, by the encoder, a target run-length encoding manner based on the target attribute information distribution characteristic value; and
  performing, by the encoder, encoding processing on the attribute information based on the target run-length encoding manner.

According to a second aspect, a point cloud decoding method is provided, including:
  obtaining, by a decoder, a target parameter based on a target bitstream, where the target bitstream is obtained after encoding processing is performed on attribute information of target point cloud;
  determining, by the decoder, a target run-length decoding manner based on the target parameter; and
  performing, by the decoder, decoding processing on the target bitstream based on the target run-length decoding manner; where
  the target parameter includes at least one of the following:
    a target attribute information distribution characteristic value corresponding to a target bit rate point; and
    order information of target exponential Golomb encoding.

According to a third aspect, a point cloud encoding apparatus is provided, including:
  a first determining module, configured to determine, based on attribute information of target point cloud, a target attribute information distribution characteristic value corresponding to a target bit rate point, where the target bit rate point is a bit rate point corresponding to an attribute quantization step of the attribute information;
  a second determining module, configured to determine a target run-length encoding manner based on the target attribute information distribution characteristic value; and
  a first processing module, configured to perform encoding processing on the attribute information based on the target run-length encoding manner.

According to a fourth aspect, a point cloud decoding apparatus is provided, including:
  a first obtaining module, configured to obtain a target parameter based on a target bitstream, where the target bitstream is obtained after encoding processing is performed on attribute information of target point cloud;
  a third determining module, configured to determine a target run-length decoding manner based on the target parameter; and
  a second processing module, configured to perform decoding processing on the target bitstream based on the target run-length decoding manner; where
  the target parameter includes at least one of the following:
    a target attribute information distribution characteristic value corresponding to a target bit rate point; and
    order information of target exponential Golomb encoding.

According to a fifth aspect, a point cloud encoding apparatus is provided and includes a processor and a memory, and the memory stores a program or an instruction that can run on the processor, and when the program or instruction is executed by the processor, steps of the method according to the first aspect are implemented.

According to a sixth aspect, a communication device is provided, and the communication device includes a processor and a memory. The memory stores a program or an instruction that can run on the processor, and when the program or the instruction is executed by the processor, steps of the method according to the first aspect or the second aspect are implemented.

According to a seventh aspect, a point cloud decoding apparatus is provided, including a processor and a communication interface. The processor is configured to: obtain a target parameter based on a target bitstream, where the target bitstream is obtained after encoding processing is performed on attribute information of target point cloud; determine a target run-length decoding manner based on the target parameter; and perform decoding processing on the target bitstream based on the target run-length decoding manner; where the target parameter includes at least one of the following:
  a target attribute information distribution characteristic value corresponding to a target bit rate point; and
  order information of target exponential Golomb encoding.

According to an eighth aspect, a point cloud encoding and decoding system is provided, including a point cloud encoding apparatus and a point cloud decoding apparatus. The point cloud encoding apparatus may be configured to perform steps of the point cloud encoding method according to the first aspect, and the point cloud decoding apparatus may be configured to perform steps of the point cloud decoding method according to the second aspect.

According to a ninth aspect, a readable storage medium is provided. The readable storage medium stores a program or an instruction, and when the program or the instruction is executed by a processor, steps of the method according to the first aspect are implemented, or steps of the method according to the second aspect are implemented.

According to a tenth aspect, a chip is provided. The chip includes a processor and a communication interface, the communication interface is coupled to the processor, and the processor is configured to run a program or an instruction to implement the method according to the first aspect or the method according to the second aspect.

According to an eleventh aspect, a computer program product is provided. The computer program product is stored in a storage medium, and the computer program product is executed by at least one processor to implement steps of the method according to the first aspect or steps of the method according to the second aspect.

In embodiments of this application, a target attribute information distribution characteristic value is determined based on attribute information of target point cloud, a target run-length encoding manner is determined based on the target attribute information distribution characteristic value, and encoding processing is performed on attribute information based on the target run-length encoding manner. In this way, the target run-length encoding manner is determined based on different target attribute information distribution characteristic values, instead of using a same run-length encoding manner for different attribute information, that is, a corresponding run-length encoding manner is adaptively selected based on distribution of the attribute information at different code rate points, so that different run-length encoding manners can be used for different run-length lengths, thereby effectively improving encoding efficiency.

DETAILED DESCRIPTION

The following clearly describes technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects instead of describing a specific order or sequence. It should be understood that the terms used in this way are interchangeable in appropriate circumstances such that the embodiments of this application can be implemented in other orders than the order illustrated or described herein. In addition, objects distinguished by "first" and "second" are generally of a same type, and the number of objects is not limited, for example, there may be one or more first objects. In addition, in the specification and claims, "and/or" represents at least one of connected objects, and a character "/" generally represents an "or" relationship between associated objects.

A point cloud encoding apparatus corresponding to a point cloud encoding method in the embodiments of this application and a point cloud decoding apparatus corresponding to a point cloud decoding method may both be terminals. The terminal may be also referred to as a terminal device or user equipment (User Equipment, UE). The terminal may be a terminal side device such as a mobile phone, a tablet personal computer (Tablet Personal Computer), a laptop computer (Laptop Computer) which is also referred to as a notebook computer, a personal digital assistant (Personal Digital Assistant, PDA), a palmtop computer, a netbook, an ultra-mobile personal computer (ultra-mobile personal computer, UMPC), a mobile Internet device (Mobile Internet Device, MID), an augmented reality (augmented reality, AR)/virtual reality (virtual reality, VR) device, a robot, a wearable device (Wearable Device), vehicle user equipment (Vehicle User Equipment, VUE), or pedestrian user equipment (Pedestrian User Equipment, PUE). The wearable device includes a smart watch, a bracelet, a headset, glasses, or the like. It should be noted that a specific type of the terminal is not limited in the embodiments of this application.

To enable a person skilled in the art to better understand the embodiments of this application, an AVS codec framework is first described as follows.

Figure 1:
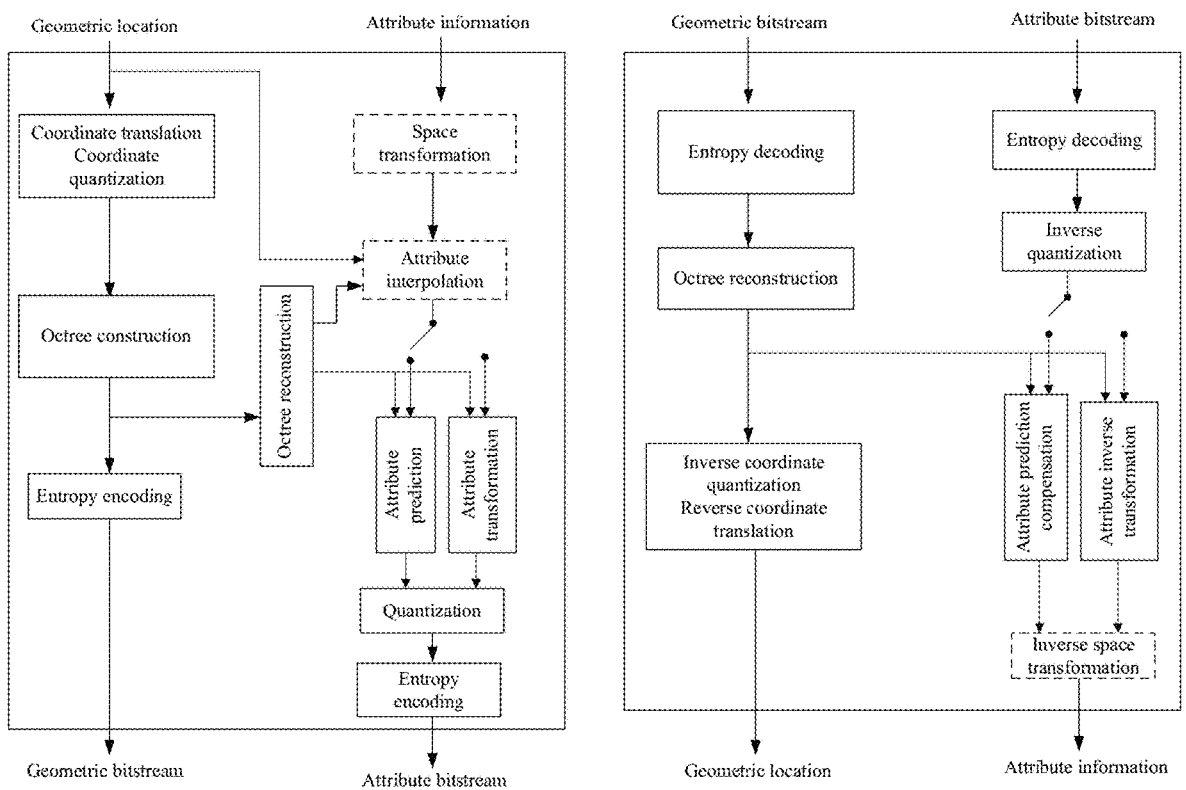
FIG. 1 is a schematic diagram of a structure of a point cloud AVS encoder framework.

As shown in FIG. 1, in a point cloud AVS encoder framework, geometric information of point cloud and attribute information corresponding to each point are separately encoded. First, the point cloud is preprocessed. First, a minimum cube that includes all points in input point cloud is constructed for the point cloud, which is referred to as a bounding box (bounding box). Origin coordinates of the bounding box are minimum values of coordinates of each point in the point cloud in three dimensions: x, y, and z. Then, coordinate conversion is performed on a point in the point cloud: A coordinate origin is used as a reference, and original coordinates of the point are converted into relative coordinates of a relative coordinate origin. Then, geometric coordinates of the point are quantized. This step is mainly used for scaling. Due to quantization rounding, geometric information of some points is the same, and it is determined, based on parameters, whether to remove points with repeated geometric information. Next, octree (quadtree or binary tree) division is performed on the preprocessed point cloud in a breadth-first traversal sequence: Eight sub-cubes are generated as sub-nodes of the octree (quadtree or binary tree) by using the preprocessed bounding box as a root node, and eight bits are used to represent occupation information of a sub-node of the octal tree, which is referred to as a space occupation code. If there is a bit in the sub-cube, it indicates that the sub-node is occupied, and a value of a corresponding occupied bit is 1; otherwise, the value is 0. The occupied sub-cube is further divided, and division is stopped when an obtained leaf node is a unit cube of 1×1×1, to complete encoding of the geometric octree. In an octree encoding process, entropy encoding is performed on the generated space occupation code and a quantity of points included in a final leaf node to obtain an output bitstream. In an octree-based geometric decoding process, a decoder continuously obtains an occupation code of each node through continuous parsing in a breadth-first traversal sequence, and sequentially divides nodes and stops division when a unit cube of the 1×1×1 is obtained through division, a quantity of points included in each leaf node is obtained through parsing, and geometric reconstruction point cloud information is finally obtained through recovery.

After geometric encoding is completed, geometric information is reconstructed, and attribute information is encoded by using the reconstructed geometric information. Currently, attribute encoding is mainly performed on color and reflectance information. First, it is determined whether color space conversion is performed. If color space conversion is performed, color information is converted from Red Green Blue (Red Green Blue, RGB) color space to Luminance Chrominance (YUV) color space. Then, in a case of geometric lossy encoding, attribute interpolation needs to be performed on the reconstructed point cloud, that is, recoloring is performed, and a new attribute value is calculated for each point in the reconstructed point cloud, so that an attribute error between the reconstructed point cloud and the original point cloud is minimum. Attribute information encoding is divided into three branches: attribute prediction, attribute prediction transformation, and attribute transformation. An attribute prediction process is as follows: First, point cloud is re-sorted, and then differential prediction is performed. In the current AVS encoding framework, a Hilbert (Hilbert) code is used to re-sort point cloud. Then, attribute prediction is performed on the sorted point cloud. If geometric information of a current to-be-encoded point is the same as that of a previous coded point, that is, the to-be-encoded point is a repeated point, a reconstruction attribute value of the repeated point is used as attribute prediction value of the current to-be-encoded point. Otherwise, the first m points in a Hilbert sequence are selected as neighbor candidate points for the current to-be-encoded point, and then an Manhattan distance between the to-be-encoded point and geometric information of the current to-be-encoded point is separately calculated, and n points that are closest to the current to-be-encoded point are determined as neighbors of the current to-be-encoded point, and weighted averages of all neighbor attributes are calculated as attribute prediction values of the current to-be-encoded point by using a reciprocal of the distance as a weight. A prediction residual is calculated by using the attribute prediction value and the attribute value of the current to-be-encoded point, and finally, the prediction residual is quantized and entropy coded to generate a binary bitstream. An attribute prediction transformation process is as follows: A point cloud sequence is first grouped based on spatial confidentiality of the point cloud, and then attribute information of the point cloud is predicted. An obtained prediction residual is transformed to quantize an obtained transform coefficient. Finally, entropy encoding is performed on the quantized transform coefficient and an attribute residual to generate a binary bitstream. An attribute transformation process is as follows: First, wavelet transformation is performed on a point cloud attribute, and a transform coefficient is quantized; an attribute reconstruction value is obtained through inverse quantization and inverse wavelet transform; then, a difference between an original attribute and an attribute reconstruction value is calculated to obtain an attribute residual and quantize the attribute residual; and finally, entropy encoding is performed on the quantized transform coefficient and the attribute residual to generate a binary bitstream. The embodiments of this application mainly focus on entropy encoding and entropy decoding processes in the accompanying drawings.

The following describes in detail the point cloud encoding method provided in the embodiments of this application by using some embodiments and application scenarios thereof with reference to the accompanying drawings.

Figure 2:
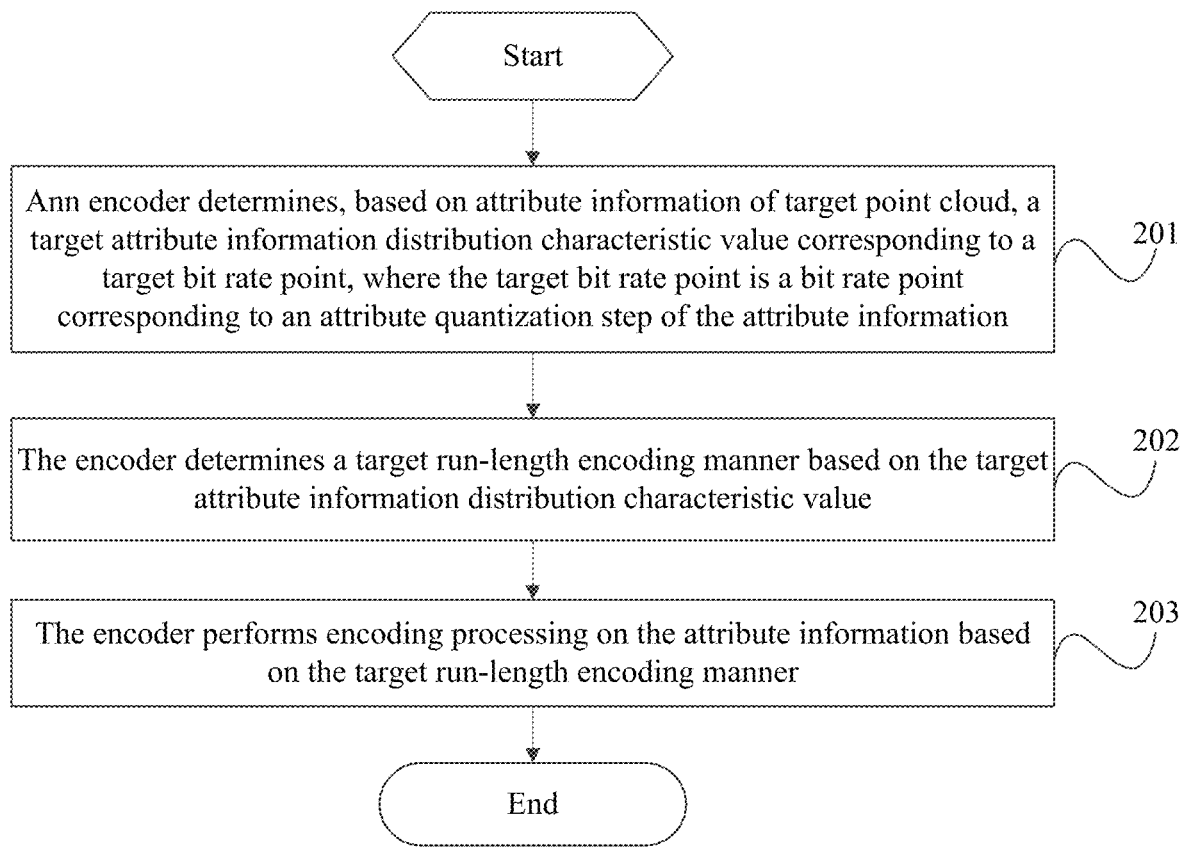
FIG. 2 is a schematic flowchart of a point cloud encoding method according to an embodiment of this application.

As shown in FIG. 2, an embodiment of this application provides a point cloud encoding method, including the following steps.

Step 201: An encoder determines, based on attribute information of target point cloud, a target attribute information distribution characteristic value corresponding to a target bit rate point, where the target bit rate point is a bit rate point corresponding to an attribute quantization step of the attribute information.

Optionally, the foregoing target point cloud is a point cloud sequence or a point cloud slice (slice) in the point cloud sequence. The target point cloud is point cloud obtained after preprocessing is performed on to-be-encoded target point cloud, and the preprocessing includes at least one of coordinate translation, quantization processing, and removing a repeated point.

The foregoing target attribute information distribution characteristic value may be obtained by performing processing according to a preset algorithm based on the attribute information, for example, obtained by averaging the attribute information, or obtained based on a difference between a maximum value and a minimum value of the attribute information.

In this embodiment of this application, an attribute category may include color, reflectance, and the like, and the attribute information may include specific color information, reflectance information, and the like.

Step 202: The encoder determines a target run-length encoding manner based on the target attribute information distribution characteristic value.

In this step, the target run-length encoding manner is determined based on the target attribute information distribution characteristic value, that is, an objective of adaptively selecting a corresponding run-length encoding manner based on distribution of the attribute information at different bit rate points is implemented.

Step 203: The encoder performs encoding processing on the attribute information based on the target run-length encoding manner.

The encoding processing herein may be specifically entropy encoding processing.

In this embodiment of this application, a target attribute information distribution characteristic value is determined based on attribute information of target point cloud, a target run-length encoding manner is determined based on the target attribute information distribution characteristic value, and encoding processing is performed on attribute information based on the target run-length encoding manner. In this way, the target run-length encoding manner is determined based on different target attribute information distribution characteristic values, instead of using a same run-length encoding manner for different attribute information, that is, a corresponding run-length encoding manner is adaptively selected based on distribution of the attribute information at different code rate points, so that different run-length encoding manners can be used for different run-length lengths, thereby effectively improving encoding efficiency.

Optionally, that the encoder determines, based on the attribute information of the target point cloud, the target attribute information distribution characteristic value corresponding to the target bit rate point includes:

determining, by the encoder, a distribution characteristic value of the attribute information of the target point cloud; and determining, by the encoder based on the distribution characteristic value of the attribute information, the target attribute information distribution characteristic value corresponding to the target bit rate point.

Herein, the distribution characteristic value of the attribute information of the target point cloud is first determined, the target attribute information distribution characteristic value corresponding to the target bit rate point is further determined based on the distribution characteristic value of the attribute information, and the target attribute information distribution characteristic value can be used to determine distribution information of the attribute information at a current bit rate point, so that subsequently, a run-length encoding manner can be adaptively selected based on the target attribute information distribution characteristic value.

Optionally, in this embodiment of this application, the target attribute information distribution characteristic value meets the following formula:

$$disAttr' = \frac{disAttr}{AttrQuantStep},$$

disAttr represents the distribution characteristic value of the attribute information of the target point cloud, AttrQuantStep represents an attribute quantization step of the attribute information, and disAttr' represents the target attribute information distribution characteristic value.

In an optional implementation, that the encoder determines the distribution characteristic value of the attribute information of the target point cloud includes:

obtaining, by the encoder, a maximum value and a minimum value of target attribute information, where the target attribute information is attribute information of a point cloud subset of the target point cloud, or is the attribute information of the target point cloud; and determining, by the encoder, the distribution characteristic value of the attribute information of the target point cloud based on the maximum value and the minimum value of the attribute information of the point cloud subset.

For example, a point cloud subset in the target point cloud is traversed, a maximum value and a minimum value of the attribute information in the point cloud subset are recorded, and the distribution characteristic value of the attribute information of the target point cloud is determined based on the maximum value and the minimum value.

Optionally, the distribution characteristic value of the attribute information of the target point cloud meets the following formula:

disAttr=Attrmin$_{max}$, where disAttr represents the distribution characteristic value of the attribute information of the target point cloud, Attr$_{max}$ represents a maximum value of the attribute information, and Attr$_{min}$ represents a minimum value of the attribute information.

In another optional implementation, that the encoder determines the distribution characteristic value of the attribute information of the target point cloud includes:

obtaining, by the encoder, an average value of absolute values of the attribute information of the target point cloud; and determining, by the encoder, the distribution characteristic value of the attribute information of the target point cloud based on the average value.

In a first optional implementation, that the encoder determines the target run-length encoding manner based on the target attribute information distribution characteristic value includes at least one of the following:

in a case that the target attribute information distribution characteristic value is less than or equal to a first preset threshold, determining, by the encoder, that the target run-length encoding manner is a first run-length encoding manner; and in a case that the target attribute information distribution characteristic value is greater than the first preset threshold, determining, by the encoder, that the target run-length encoding manner is a second run-length encoding manner.

Herein, in a case that the target attribute information distribution characteristic value is less than or equal to a first preset threshold, it is determined that a case that attribute residuals or transform coefficients are distributed at 0 is the majority, and in this case, a length of a run-length is relatively long, and run-length encoding is performed in the foregoing first run-length encoding manner; and in a case that the target attribute information distribution characteristic value is greater than a first preset threshold, a case that attribute residuals or transform coefficients are distributed at 0 is relatively small, and in this case, the length of the run-length is relatively short, and the foregoing second run-length encoding manner is selected to perform run-length encoding.

In a second optional implementation, that the encoder determines the target run-length encoding manner based on the target attribute information distribution characteristic value includes:

determining, by the encoder, order information of target exponential Golomb encoding based on the target attribute information distribution characteristic value; and determining the target run-length encoding manner based on the order information of the target exponential Golomb encoding.

Optionally, an order of the target exponential Golomb encoding is positively correlated with the target attribute information distribution characteristic value; or an order of the target exponential Golomb encoding meets the following formula:

Index=log$_2$ d isAttr', where disAttr' represents the target attribute information distribution characteristic value, Index represents an index of the order of the target exponential Golomb encoding, and the index of the order of the target exponential Golomb encoding is in one-to-one correspondence with the order of the target exponential Golomb encoding.

Herein, after the index of the order of the target exponential Golomb encoding is obtained, the order of the target exponential Golomb encoding corresponding to the index of the order of the target exponential Golomb encoding is searched for based on a preset relationship table. The relationship table stores the index of the order of the target exponential Golomb encoding and the order of the target exponential Golomb encoding that are stored based on a correspondence.

In the second optional implementation, a parameter GolombNumber[num_attr_type] is introduced into an attribute parameter set APS by using a spatial distribution state of a current point cloud sequence, that is, an exponential Golomb order selected by different types of attributes at a current bit rate point, and a run-length encoding manner to be selected for run-length encoding is determined based on a corresponding exponential Golomb order. Where num_attr_type is the number of attribute types of to-be-encoded point cloud, a value of GolombNumber [attrIdx] (attrIdx=0, 1, . . . , num_attr_type−1) indicates an exponential Golomb order of an (attrIdx)$^{th}$ attribute, the value of GolombNumber [attrIdx] is an integer greater than or equal to 0, and attrIdx is used to identify different attribute types. For example, a current AVS point cloud data set mainly includes two types of attributes: color and reflectance. For a correspondence between attrIdx and an attribute type in this embodiment of this application, reference may be made to Table 1.

TABLE 1

| attrIdx | Attribute type |
|---|---|
| 0 | Color |
| 1 | Reflectance |

In addition, in this embodiment of this application, after the order of the target exponential Golomb encoding is obtained, the order of the target exponential Golomb encoding is written into an attribute information parameter set APS.

Optionally, in the second optional implementation, that the encoder determines the target run-length encoding manner based on the order information of the target exponential Golomb encoding includes at least one of the following:

in a case that an order of the target exponential Golomb encoding is less than or equal to a second preset threshold, determining, by the encoder, that the target run-length encoding manner is a first run-length encoding manner; and in a case that the order of the target exponential Golomb encoding is greater than the second preset threshold, determining, by the encoder, that the target run-length encoding manner is a second run-length encoding manner.

Herein, in a case that the order of the target exponential Golomb encoding is less than or equal to a second preset threshold, it is determined that a case that attribute residuals or transform coefficients are distributed at 0 is the majority, and in this case, a length of a run-length is relatively long, and run-length encoding is performed in the foregoing first run-length encoding manner; and in a case that the order of the target exponential Golomb encoding is greater than the second preset threshold, a case that attribute residuals or transform coefficients are distributed at 0 is relatively small, and in this case, the length of the run-length is relatively short, and the foregoing second run-length encoding manner is selected to perform run-length encoding.

Optionally, that the encoder determines the target run-length encoding manner based on the target attribute information distribution characteristic value includes:

in a case that a target encoding length corresponding to the target point cloud is greater than a third preset threshold, determining, by the encoder, the target run-length encoding manner based on the target attribute information distribution characteristic value.

In this embodiment of this application, in a case that a target encoding length corresponding to the target point cloud is less than or equal to a third preset threshold, that is, a target encoding length is relatively short, a uniform run-length encoding manner may be selected based on historical statistical data. In this way, encoding efficiency can be effectively ensured. The historical statistical data includes a run-length encoding manner used for an encoding length with a relatively small value.

In a case that the target encoding length corresponding to the target point cloud is greater than the third preset threshold, that is, the target encoding length is relatively long, a run-length encoding manner is adaptively selected based on the target attribute information distribution characteristic value, for example, the first run-length encoding manner or the second run-length encoding manner is selected, so that encoding efficiency of a relatively long encoding length can be effectively ensured.

Optionally, the first run-length encoding manner is an Nth-order exponential Golomb encoding manner, and N is greater than or equal to 0; and the second run-length encoding manner is an arithmetic encoding manner.

Optionally, before algorithm encoding is performed, binarization processing is performed.

A process of performing encoding based on a run-length encoding manner in this embodiment of this application is specifically described below.

If a current length value that needs to be coded is length, a specific procedure of run-length encoding is as follows:

First, it is determined whether the current length is 0. If the current length is 0, the encoding ends.

If the value is not 0, whether the current length is 1 is determined. If the value is 1, the encoding ends.

If the value is not 1, whether the current length is 2 is determined. If the value is 2, the encoding ends.

If the value is not 2, a value of N$^{th}$-order exponential Golomb encoding length-3 is used. Alternatively, if the value is not 2, arithmetic encoding is performed after binarization is performed on the value of length-3.

According to the method in this embodiment of this application, in an attribute entropy encoding process, when an encoding length is large, different run-length encoding manners are selected based on distribution of attribute information of different attribute types at different bit rate points, and performing entropy encoding by using the run-length encoding manner can effectively reduce inter-information redundancy and further improve encoding efficiency.

An experimental result shows that encoding performance can be improved by using the method in this embodiment of this application. As shown in the following Table 2, in a preset test condition, compression efficiency of this solution is higher than that of PCRMV5.0. (PSNR is an objective standard for image evaluation). Larger PSNR indicates better image quality. AVSCat1A is a test sequence whose attribute information is reflectance information. AVSCat1B is a test sequence whose attribute information is color information. AVSCat1C is a test sequence whose attribute information includes reflectance information and color information. AVSCat2 is a test sequence whose attribute information is reflectance information and is a multi-frame sequence. AVSCat3 is a test sequence whose attribute information is color information and is a multi-frame sequences. AVSCat1A+AVSCat2 average is an average performance gain of the two test sequences. Overall average represents an average performance gain of all test sequences. End-to-End BD-AttrReate (that is, EtE Hausdorff BD-AttrRate) is a parameter used to measure encoding performance of attribute information. When BD-AttrReate is negative, it indicates that the performance is getting better. On this basis, a larger absolute value of BD-AttrReate indicates a larger performance gain. limit-lossy is an encoding condition in which a geometry is lossy and an attribute is lossy. Luma, Chroma Cb, and Chroma Cr represent three components of a color channel, and reflectance represents reflectance information. They are all attribute information of point cloud. For a currently tested point cloud sequence, at least one of the foregoing attribute information is included. "-" indicates that there is no data for this item. A generated performance result is shown in Table 2.

The target parameter includes at least one of the following:
a target attribute information distribution characteristic value corresponding to a target bit rate point; and
order information of target exponential Golomb encoding.
In this step, the decoder may obtain the foregoing target parameter from the foregoing target bitstream. After obtaining the foregoing target parameter, an encoder adds the foregoing target parameter to the target bitstream, so that the decoder determines a target run-length decoding manner based on the foregoing target parameter.

Step 302: The decoder determines a target run-length decoding manner based on the target parameter.

Step 303: The decoder performs decoding processing on the target bitstream based on the target run-length decoding manner.

According to the method in this embodiment of this application, the decoder obtains the target parameter based

TABLE 2

| | | Lossless geometry, limit-lossy attributes [all intra] EtE Hausdorff BD-AttrRate [%] | | | |
|---|---|---|---|---|---|
| | Test sequence | Luma | Chroma Cb | Chroma Cr | Reflectance |
| AVSCat1A | bridge__1mm | — | — | — | 0.0% |
| | double__T__section__1mm | — | — | — | 0.0% |
| | intersection1__1mm | — | — | — | 0.0% |
| | intersection2__1mm | — | — | — | 0.0% |
| | straight__road__1mm | — | — | — | 0.0% |
| | T__section__1mm | — | — | — | 0.0% |
| AVSCat1B | stanford__area__2__vox20 | 0.0% | 0.0% | 0.0% | — |
| | stanford__area__4__vox20 | 0.0% | 0.0% | 0.0% | — |
| | Church__vox16 | 0.0% | 0.0% | 0.0% | — |
| | Courthouse__vox16 | 0.0% | 0.0% | 0.0% | — |
| | Ignatius__vox11 | 0.0% | 0.0% | 0.0% | — |
| | QQdog__vox15 | −0.4% | −0.4% | −0.4% | — |
| | Truck__vox15 | 0.0% | 0.0% | 0.0% | — |
| AVSCat1C | pcl__room__vox14 | 0.0% | 0.0% | 0.0% | 0.0% |
| | pcl__hawk__vox11 | 0.0% | 0.0% | 0.0% | 0.0% |
| | pcl__sofa__vox10 | 0.1% | 0.1% | 0.1% | 0.0% |
| | pcl__papi__vox11 | −0.1% | −0.1% | −0.1% | 0.0% |
| AVSCat2-frame | ford__01 | — | — | — | −0.1% |
| | ford__02 | — | — | — | 0.0% |
| | ford__03 | — | — | — | 0.0% |
| | livox__01__all | — | — | — | −0.3% |
| | livox__02__all | — | — | — | −0.1% |
| AVSCat3 | basketball__player__vox11 | −0.3% | −0.3% | −0.3% | — |
| | dancer__player__vox11 | −0.1% | −0.1% | −0.1% | — |
| | exercise__vox11 | −0.3% | −0.3% | −0.3% | — |
| | model__vox11 | −0.1% | −0.1% | −0.1% | — |
| Average | AVSCat1A | — | — | — | 0.0% |
| | AVSCat1B | −0.1% | −0.1% | −0.1% | — |
| | AVSCat1C | 0.0% | 0.0% | 0.0% | 0.0% |
| | AVSCat2-frame | — | — | — | −0.1% |
| | AVSCat3 | −0.2% | −0.2% | −0.2% | — |
| | AVSCat1A + AVSCat2 | — | — | — | 0.0% |
| | Overall average | −0.1% | −0.1% | −0.1% | 0.0% |

Figure 3:
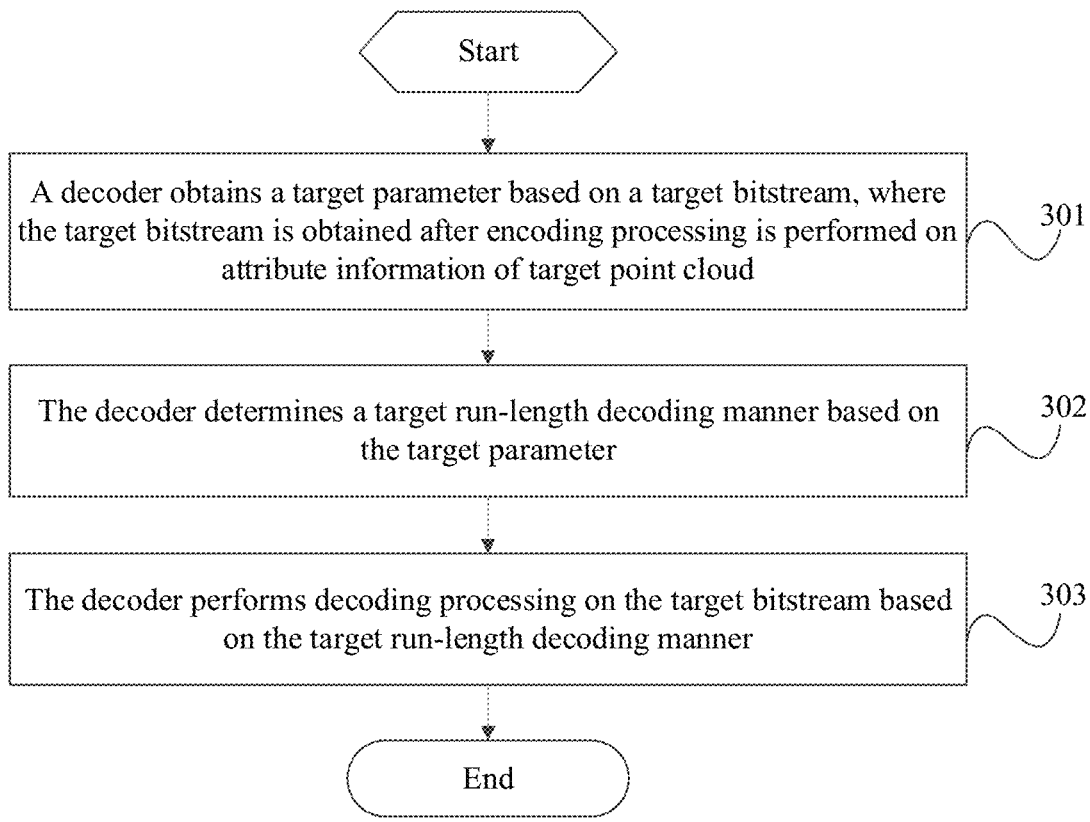
FIG. 3 is a schematic flowchart of a point cloud decoding method according to an embodiment of this application.

As shown in FIG. 3, an embodiment of this application further provides a point cloud decoding method, including the following steps.

Step 301: A decoder obtains a target parameter based on a target bitstream, where the target bitstream is obtained after encoding processing is performed on attribute information of target point cloud.

Optionally, the foregoing target point cloud is a point cloud sequence or a point cloud slice (slice) in the point cloud sequence. The target point cloud is point cloud obtained after preprocessing is performed on to-be-encoded target point cloud, and the preprocessing includes at least one of coordinate translation, quantization processing, and removing a repeated point.

on the target bitstream, where the target parameter includes at least one of the target attribute information distribution characteristic value corresponding to the target code rate point or the order information of the target exponential Golomb encoding; the decoder determines the target run-length decoding manner based on the target parameter; and the decoder performs decoding processing on the target bitstream based on the target run-length decoding manner. In this way, the target run-length encoding manner is determined based on different target attribute information distribution characteristic values or order information of the target exponential Golomb encoding, instead of using a same run-length decoding manner for different attribute information, that is, a corresponding run-length decoding manner is adaptively selected based on distribution of attribute information at different bit rates, so that different run-length decoding manners can be used for different run-lengths, thereby effectively improving decoding efficiency.

Optionally, that the decoder determines the target run-length decoding manner based on the target parameter includes at least one of the following:

in a case that the target attribute information distribution characteristic value is less than or equal to a first preset threshold, determining, by the decoder, that the target run-length decoding manner is a first run-length decoding manner; and in a case that the target attribute information distribution characteristic value is greater than the first preset threshold, determining, by the decoder, that the target run-length decoding manner is a second run-length decoding manner.

Herein, in a case that the target attribute information distribution characteristic value is less than or equal to a first preset threshold, it is determined that a case that attribute residuals or transform coefficients are distributed at 0 is the majority, and in this case, a length of a run-length is relatively long, and run-length decoding is performed in the foregoing first run-length decoding manner; and in a case that the target attribute information distribution characteristic value is greater than a second preset threshold, a case that attribute residuals or transform systems are distributed at 0 is relatively small, and in this case, the length of the run-length is relatively short, and the foregoing second run-length decoding manner is selected to perform run-length decoding.

Optionally, that the decoder determines the target run-length decoding manner based on the target parameter includes at least one of the following:

in a case that an order of the target exponential Golomb encoding is less than or equal to a second preset threshold, determining, by the decoder, that the target run-length decoding manner is a first run-length decoding manner; and in a case that the order of the target exponential Golomb encoding is greater than the second preset threshold, determining, by the decoder, that the target run-length decoding manner is a second run-length decoding manner.

Herein, in a case that the order of the target exponential Golomb encoding is less than or equal to a second preset threshold, it is determined that a case that attribute residuals or transform coefficients are distributed at 0 is the majority, and in this case, a length of a run-length is relatively long, and run-length decoding is performed in the foregoing first run-length decoding manner; and in a case that the order of the target exponential Golomb encoding is greater than the second preset threshold, a case that attribute residuals or transform coefficients are distributed at 0 is relatively small, and in this case, the length of the run-length is relatively short, and the foregoing second run-length decoding manner is selected to perform run-length decoding.

Optionally, that the decoder determines the target run-length decoding manner based on the target parameter includes:

in a case that a target decoding length corresponding to the target bitstream is greater than a third preset threshold, determining, by the decoder, the target run-length decoding manner based on the target parameter.

In this embodiment of this application, the target decoding length corresponding to the target point cloud is less than or equal to a third preset threshold, that is, the target encoding length is relatively small, and a uniform run-length decoding manner may be selected based on historical statistical data. In this way, decoding efficiency can be effectively ensured. The historical statistical data includes a run-length decoding manner used by a relatively small decoding length.

When the target decoding length corresponding to the target point cloud is greater than the third preset threshold, that is, when the target decoding length is relatively large, a run-length decoding manner is selected adaptively based on the target attribute information distribution characteristic value, for example, the first run-length decoding manner is selected or the second run-length decoding manner is selected, so that decoding efficiency of a relatively large decoding length can be effectively ensured.

Optionally, the first run-length decoding manner is an $N^{th}$-order Golomb decoding manner, and N is greater than or equal to 0; and the second run-length decoding manner is a bit-by-bit decoding manner.

If a current length value that needs to be decoded is length, a specific procedure of decoding is as follows:

First, a context model isZero is used to perform decoding to determine whether it is 0. If 1 is obtained through decoding (1 herein represents true), a current length is 0, and decoding ends. If 0 is obtained through decoding (that is, false), a context model isOne is used to determine whether it is 1. If 1 is obtained through decoding (1 herein represents true), the current length is 1, and decoding ends. If 0 is obtained through decoding (that is, false), a context model isTwo is used to determine whether it is 2. If 1 is obtained through decoding (1 herein represents true), the current length is 2, and decoding ends. If 0 is obtained through decoding (that is, false, which indicates that the length is greater than 2), Nth-order exponential Golomb is used to perform decoding or decoding is performed bit by bit, and length' is obtained, and a current length value is obtained as length=length'+3.

According to the method in this embodiment of this application, the decoder obtains the target parameter based on the target bitstream, where the target parameter includes at least one of the target attribute information distribution characteristic value corresponding to the target code rate point or the order information of the target exponential Golomb encoding; the decoder determines the target run-length decoding manner based on the target parameter; and the decoder performs decoding processing on the target bitstream based on the target run-length decoding manner. In this way, the target run-length encoding manner is determined based on different target attribute information distribution characteristic values or order information of the target exponential Golomb encoding, instead of using a same run-length decoding manner for different attribute information, that is, a corresponding run-length decoding manner is adaptively selected based on distribution of attribute information at different bit rates, so that different run-length decoding manners can be used for different run-lengths, thereby effectively improving decoding efficiency.

The point cloud encoding method provided in the embodiments of this application may be performed by a point cloud encoding apparatus. In the embodiments of this application, that the point cloud encoding apparatus performs the point cloud encoding method is used as an example to describe the point cloud encoding apparatus provided in the embodiments of this application.

Figure 4:
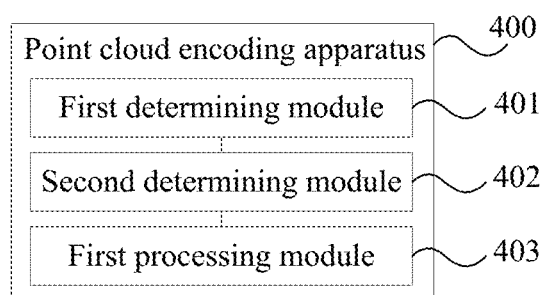
FIG. 4 is a schematic module diagram of a point cloud encoding apparatus according to an embodiment of this application.

As shown in FIG. 4, an embodiment of this application provides a point cloud encoding apparatus 400, including:

a first determining module 401, configured to determine, based on attribute information of target point cloud, a target attribute information distribution characteristic value corresponding to a target bit rate point, where the target bit rate point is a bit rate point corresponding to an attribute quantization step of the attribute information;

a second determining module 402, configured to determine a target run-length encoding manner based on the target attribute information distribution characteristic value; and a first processing module 403, configured to perform encoding processing on the attribute information based on the target run-length encoding manner.

According to the apparatus in this embodiment of this application, a target attribute information distribution characteristic value is determined based on attribute information of target point cloud, a target run-length encoding manner is determined based on the target attribute information distribution characteristic value, and encoding processing is performed on attribute information based on the target run-length encoding manner. In this way, the target run-length encoding manner is determined based on different target attribute information distribution characteristic values, instead of using a same run-length encoding manner for different attribute information, that is, a corresponding run-length encoding manner is adaptively selected based on distribution of the attribute information at different code rate points, so that different run-length encoding manners can be used for different run-length lengths, thereby effectively improving encoding efficiency.

Optionally, the first determining module includes:

a first determining submodule, configured to determine a distribution characteristic value of the attribute information of the target point cloud; and a second determining submodule, configured to determine, based on the distribution characteristic value of the attribute information, the target attribute information distribution characteristic value corresponding to the target bit rate point.

Optionally, the first determining submodule includes:

a first obtaining unit, configured to obtain a maximum value and a minimum value of target attribute information, where the target attribute information is attribute information of a point cloud subset of the target point cloud, or is the attribute information of the target point cloud; and a first determining unit, configured to determine the distribution characteristic value of the attribute information of the target point cloud based on the maximum value and the minimum value of the attribute information of the point cloud subset.

Optionally, the distribution characteristic value of the attribute information of the target point cloud meets the following formula:

$disAttr = Attrmin_{max}$, where disAttr represents the distribution characteristic value of the attribute information of the target point cloud, $Attr_{max}$ represents a maximum value of the attribute information, and $Attr_{min}$ represents a minimum value of the attribute information.

Optionally, the first determining submodule includes:

a second obtaining unit, configured to obtain an average value of absolute values of the attribute information of the target point cloud; and a second determining unit, configured to determine the distribution characteristic value of the attribute information of the target point cloud based on the average value.

Optionally, the target attribute information distribution characteristic value meets the following formula:

$$disAttr' = \frac{disAttr}{AttrQuantStep},$$

disAttr represents the distribution characteristic value of the attribute information of the target point cloud, AttrQuantStep represents an attribute quantization step of the attribute information, and disAttr' represents the target attribute information distribution characteristic value.

Optionally, the second determining module is configured to perform at least one of the following:

in a case that the target attribute information distribution characteristic value is less than or equal to a first preset threshold, determining that the target run-length encoding manner is a first run-length encoding manner; and in a case that the target attribute information distribution characteristic value is greater than the first preset threshold, determining that the target run-length encoding manner is a second run-length encoding manner.

Optionally, the second determining module includes:

a third determining submodule, configured to determine order information of target exponential Golomb encoding based on the target attribute information distribution characteristic value; and a fourth determining submodule, configured to determine the target run-length encoding manner based on the order information of the target exponential Golomb encoding.

Optionally, the order of the target exponential Golomb encoding is positively correlated with the target attribute information distribution characteristic value; or an order of the target exponential Golomb encoding meets the following formula:

Index=log$_2$ disAttr', where disAttr' represents the target attribute information distribution characteristic value, Index represents an index of the order of the target exponential Golomb encoding, and the index of the order of the target exponential Golomb encoding is in one-to-one correspondence with the order of the target exponential Golomb encoding.

Optionally, the second determining module is configured to perform at least one of the following:

in a case that an order of the target exponential Golomb encoding is less than or equal to a second preset threshold, determining that the target run-length encoding manner is a first run-length encoding manner; and in a case that the order of the target exponential Golomb encoding is greater than the second preset threshold, determining that the target run-length encoding manner is a second run-length encoding manner.

Optionally, the first processing module is configured to perform at least one of following:

in a case that a target encoding length corresponding to the target point cloud is greater than a third preset threshold, determining the target run-length encoding manner based on the target attribute information distribution characteristic value.

Optionally, the first run-length encoding manner is an Nth-order exponential Golomb encoding manner, and N is greater than or equal to 0; and the second run-length encoding manner is an arithmetic encoding manner.

According to the apparatus in this embodiment of this application, a target attribute information distribution characteristic value is determined based on attribute information of target point cloud, a target run-length encoding manner is determined based on the target attribute information distribution characteristic value, and encoding processing is performed on attribute information based on the target run-length encoding manner. In this way, the target run-length encoding manner is determined based on different target attribute information distribution characteristic values, instead of using a same run-length encoding manner for different attribute information, that is, a corresponding run-length encoding manner is adaptively selected based on distribution of the attribute information at different code rate points, so that different run-length encoding manners can be used for different run-length lengths, thereby effectively improving encoding efficiency.

The point cloud encoding apparatus in this embodiment of this application may be an electronic device, for example, an electronic device with an operating system, or may be a component such as an integrated circuit or a chip in the electronic device. The electronic device may be a terminal, or another device other than the terminal. For example, the another device may be a server, a network attached storage (Network Attached Storage, NAS), or the like. This is not specifically limited in this embodiment of this application.

The point cloud encoding apparatus provided in this embodiment of this application can implement the processes implemented in the method embodiment in FIG. 2, and a same technical effect is achieved. To avoid repetition, details are not described herein again.

Figure 5:
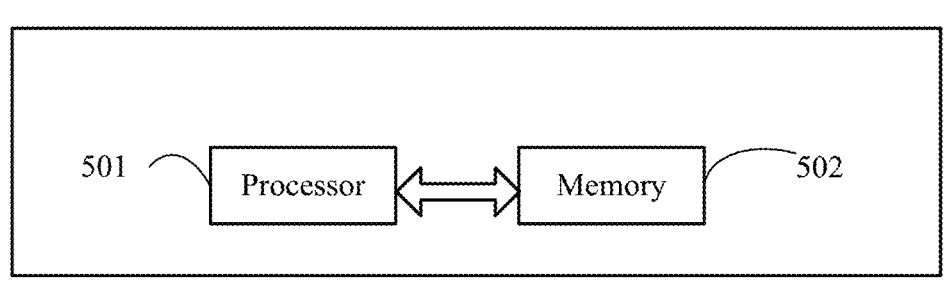
FIG. 5 is a first schematic diagram of a structure of a point cloud encoding apparatus according to an embodiment of this application.

Optionally, as shown in FIG. 5, an embodiment of this application further provides a communication device, including a processor 501 and a memory 502, and the memory 502 stores a program or an instruction that can run on the processor 501. When the program or the instruction is executed by the processor 501, steps of the embodiment of the foregoing point cloud encoding method are implemented, and a same technical effect can be achieved. To avoid repetition, details are not described herein again.

Figure 6:
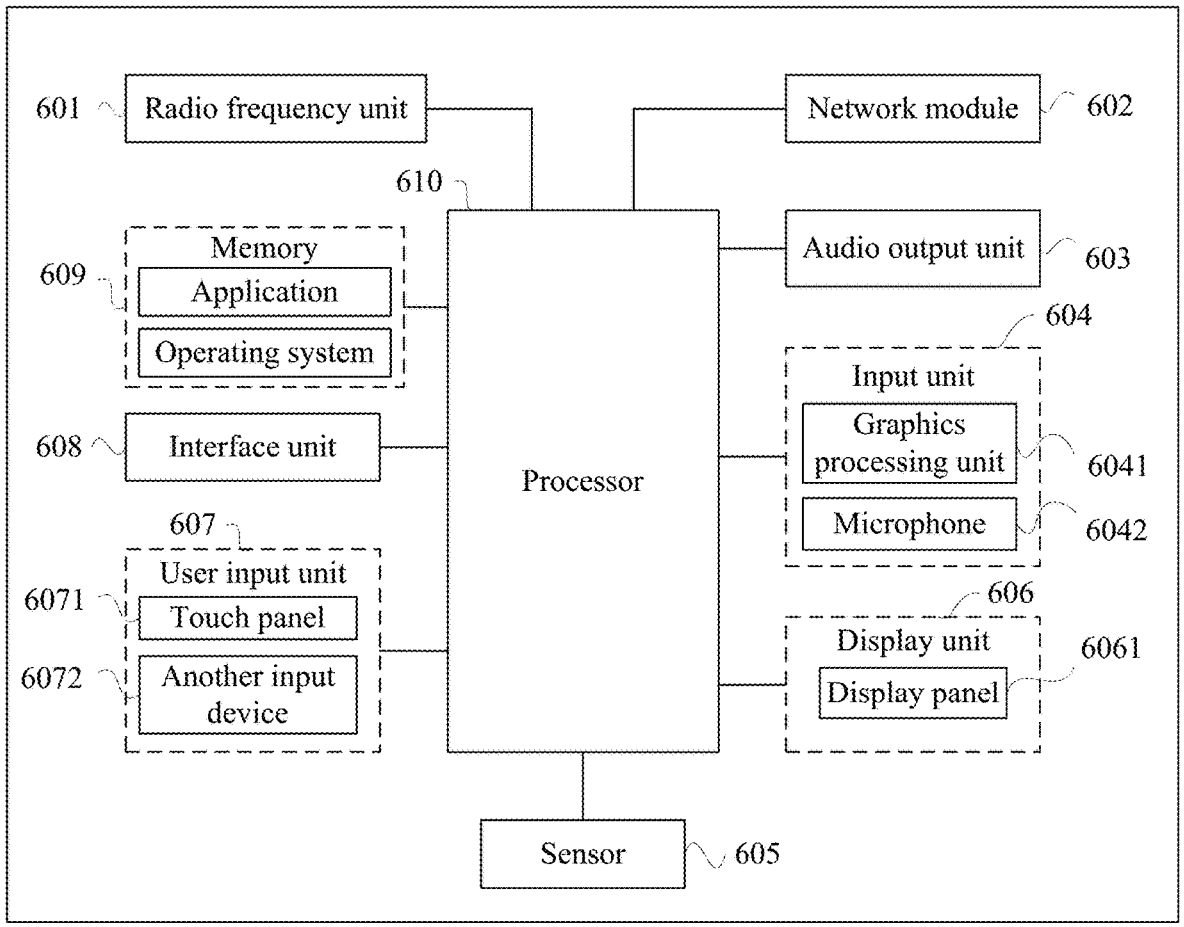
FIG. 6 is a second schematic diagram of a structure of a point cloud encoding apparatus according to an embodiment of this application.

An embodiment of this application further provides a point cloud encoding apparatus, including a processor and a communication interface. The processor is configured to: determine, based on attribute information of target point cloud, a target attribute information distribution characteristic value corresponding to a target bit rate point, where the target bit rate point is a bit rate point corresponding to an attribute quantization step of the attribute information; determine a target run-length encoding manner based on the target attribute information distribution characteristic value; and perform encoding processing on the attribute information based on the target run-length encoding manner. This apparatus embodiment is corresponding to the embodiment of the foregoing point cloud encoding method. Each implementation process and implementation of the foregoing method embodiment may be applicable to this apparatus embodiment, and a same technical effect can be achieved. Specifically, FIG. 6 is a schematic diagram of a hardware structure of a point cloud encoding apparatus according to an embodiment of this application.

The point cloud encoding apparatus includes but is not limited to at least some components in a radio frequency unit 601, a network module 602, an audio output unit 603, an input unit 604, a sensor 605, a display unit 606, a user input unit 607, an interface unit 608, a memory 609, a processor 610, and the like.

It may be understood by a person skilled in the art that the point cloud encoding apparatus may further include a power supply (such as a battery) that supplies power to each component. The power supply may be logically connected to the processor 610 by using a power management system, to implement functions such as charging, discharging, and power consumption management by using the power management system. The structure of the apparatus shown in FIG. 6 constitutes no limitation on the apparatus, and the apparatus may include more or fewer components than those shown in the figure, or combine some components, or have different component arrangements. Details are not described herein.

It should be understood that in this embodiment of this application, the input unit 604 may include a graphics processing unit (Graphics Processing Unit, GPU) 6041 and a microphone 6042. The graphics processing unit 6041 processes image data of a static picture or a video obtained by an image capture apparatus (for example, a camera) in a video capture mode or an image capture mode. The display unit 606 may include a display panel 6061. The display panel 6061 may be configured in a form such as a liquid crystal display or an organic light-emitting diode. The user input unit 607 includes at least one of a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein.

In this embodiment of this application, after receiving downlink data from a network side device, the radio frequency unit 601 may transmit the downlink data to the processor 610 for processing. In addition, the radio frequency unit 601 may send uplink data to the network side device. Generally, the radio frequency unit 601 includes but is not limited to an antenna, an amplifier, a transceiver, a coupler, a low noise amplifier, a duplexer, and the like.

The memory 609 may be configured to store a software program or an instruction and various data. The memory 609 may mainly include a first storage area for storing a program or an instruction and a second storage area for storing data. The first storage area may store an operating system, and an application or an instruction required by at least one function (for example, a sound playing function or an image playing function). In addition, the memory 609 may be a volatile memory or a non-volatile memory, or the memory 609 may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 609 in this embodiment of this application includes but is not limited to these memories and any memory of another proper type.

The processor 610 may include one or more processing units. Optionally, an application processor and a modem processor are integrated into the processor 610. The application processor mainly processes an operating system, a user interface, an application, or the like. The modem processor mainly processes a wireless communication signal, for example, a baseband processor. It may be understood that the modem processor may alternatively not be integrated into the processor 610.

The processor 610 is configured to: determine, based on attribute information of target point cloud, a target attribute information distribution characteristic value corresponding to a target bit rate point, where the target bit rate point is a bit rate point corresponding to an attribute quantization step of the attribute information; determine a target run-length encoding manner based on the target attribute information distribution characteristic value; and perform encoding processing on the attribute information based on the target run-length encoding manner.

Optionally, the processor 610 is further configured to:
determine a distribution characteristic value of the attribute information of the target point cloud; and
determine, based on the distribution characteristic value of the attribute information, the target attribute information distribution characteristic value corresponding to the target bit rate point.

Optionally, the processor 610 is further configured to:
obtain a maximum value and a minimum value of target attribute information, where the target attribute information is attribute information of a point cloud subset of the target point cloud, or is the attribute information of the target point cloud; and
determine the distribution characteristic value of the attribute information of the target point cloud based on the maximum value and the minimum value of the attribute information of the point cloud subset.

Optionally, the distribution characteristic value of the attribute information of the target point cloud meets the following formula:

$disAttr = Attrmin_{max}$, where disAttr represents the distribution characteristic value of the attribute information of the target point cloud, $Attr_{max}$ represents a maximum value of the attribute information, and $Attr_{min}$ represents a minimum value of the attribute information.

Optionally, the processor 610 is further configured to:
obtain an average value of absolute values of the attribute information of the target point cloud; and
determine the distribution characteristic value of the attribute information of the target point cloud based on the average value.

Optionally, the target attribute information distribution characteristic value meets the following formula:

$$disAttr' = \frac{disAttr}{AttrQuantStep},$$

disAttr represents the distribution characteristic value of the attribute information of the target point cloud, AttrQuantStep represents an attribute quantization step of the attribute information, and disAttr' represents the target attribute information distribution characteristic value.

Optionally, the processor 610 is further configured to perform at least one of the following:
in a case that the target attribute information distribution characteristic value is less than or equal to a first preset threshold, determining that the target run-length encoding manner is a first run-length encoding manner; and
in a case that the target attribute information distribution characteristic value is greater than the first preset threshold, determining that the target run-length encoding manner is a second run-length encoding manner.

Optionally, the processor 610 is further configured to:
determine order information of target exponential Golomb encoding based on the target attribute information distribution characteristic value; and
determine the target run-length encoding manner based on the order information of the target exponential Golomb encoding.

Optionally, the order of the target exponential Golomb encoding is positively correlated with the target attribute information distribution characteristic value; or
an order of the target exponential Golomb encoding meets the following formula:

$Index = \log_2 disAttr'$, where disAttr' represents the target attribute information distribution characteristic value, Index represents an index of the order of the target exponential Golomb encoding, and the index of the order of the target exponential Golomb encoding is in one-to-one correspondence with the order of the target exponential Golomb encoding.

Optionally, the processor 610 is further configured to perform at least one of the following:
in a case that an order of the target exponential Golomb encoding is less than or equal to a second preset threshold, determining that the target run-length encoding manner is a first run-length encoding manner; and
in a case that the order of the target exponential Golomb encoding is greater than the second preset threshold, determining that the target run-length encoding manner is a second run-length encoding manner.

Optionally, the processor 610 is further configured to:
in a case that a target encoding length corresponding to the target point cloud is greater than a third preset threshold, determine the target run-length encoding manner based on the target attribute information distribution characteristic value.

Optionally, the first run-length encoding manner is an Nth-order exponential Golomb encoding manner, and N is greater than or equal to 0; and
the second run-length encoding manner is an arithmetic encoding manner.

According to the apparatus in this embodiment of this application, a target attribute information distribution characteristic value is determined based on attribute information of target point cloud, a target run-length encoding manner is determined based on the target attribute information distribution characteristic value, and encoding processing is performed on attribute information based on the target run-length encoding manner. In this way, the target run-length encoding manner is determined based on different target attribute information distribution characteristic values, instead of using a same run-length encoding manner for different attribute information, that is, a corresponding run-length encoding manner is adaptively selected based on distribution of the attribute information at different code rate points, so that different run-length encoding manners can be used for different run-length lengths, thereby effectively improving encoding efficiency.

The point cloud decoding method provided in the embodiments of this application may be performed by a point cloud decoding apparatus. In the embodiments of this application, that the point cloud decoding apparatus performs the point cloud decoding method is used as an example to describe the point cloud decoding apparatus provided in the embodiments of this application.

Figure 7:
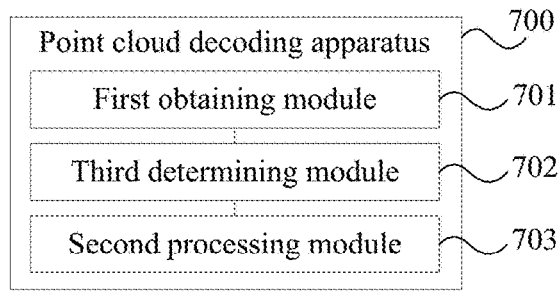
FIG. 7 is a schematic module diagram of a point cloud decoding apparatus according to an embodiment of this application.

As shown in FIG. 7, an embodiment of this application further provides a point cloud decoding apparatus 700, including:
- a first obtaining module 701, configured to obtain a target parameter based on a target bitstream, where the target bitstream is obtained after encoding processing is performed on attribute information of target point cloud;
- a third determining module 702, configured to determine a target run-length decoding manner based on the target parameter; and
- a second processing module 703, configured to perform decoding processing on the target bitstream based on the target run-length decoding manner; where
- the target parameter includes at least one of the following:
- a target attribute information distribution characteristic value corresponding to a target bit rate point; and
- order information of target exponential Golomb encoding.

The apparatus in this embodiment of this application obtains the target parameter based on the target bitstream, where the target parameter includes at least one of the target attribute information distribution characteristic value corresponding to the target code rate point or the order information of the target exponential Golomb encoding; the decoder determines the target run-length decoding manner based on the target parameter; and the decoder performs decoding processing on the target bitstream based on the target run-length decoding manner. In this way, the target run-length encoding manner is determined based on different target attribute information distribution characteristic values or order information of the target exponential Golomb encoding, instead of using a same run-length decoding manner for different attribute information, that is, a corresponding run-length decoding manner is adaptively selected based on distribution of attribute information at different bit rates, so that different run-length decoding manners can be used for different run-lengths, thereby effectively improving decoding efficiency.

Optionally, the third determining module is configured to perform at least one of the following:
- in a case that the target attribute information distribution characteristic value is less than or equal to a first preset threshold, determining that the target run-length decoding manner is a first run-length decoding manner; and
- in a case that the target attribute information distribution characteristic value is greater than the first preset threshold, determining that the target run-length decoding manner is a second run-length decoding manner.

Optionally, the third determining module is configured to perform at least one of the following:
- in a case that an order of the target exponential Golomb encoding is less than or equal to a second preset threshold, determining that the target run-length decoding manner is a first run-length decoding manner; and
- in a case that the order of the target exponential Golomb encoding is greater than the second preset threshold, determining that the target run-length decoding manner is a second run-length decoding manner.

Optionally, the second processing module is configured to:
- in a case that a target decoding length corresponding to the target bitstream is greater than a third preset threshold, determine the target run-length decoding manner based on the target parameter.

Optionally, the first run-length decoding manner is an Nth-order Golomb decoding manner, and N is greater than or equal to 0; and
the second run-length decoding manner is a bit-by-bit decoding manner.

The apparatus in this embodiment of this application obtains the target parameter based on the target bitstream, where the target parameter includes at least one of the target attribute information distribution characteristic value corresponding to the target code rate point or the order information of the target exponential Golomb encoding; the decoder determines the target run-length decoding manner based on the target parameter; and the decoder performs decoding processing on the target bitstream based on the target run-length decoding manner. In this way, the target run-length encoding manner is determined based on different target attribute information distribution characteristic values or order information of the target exponential Golomb encoding, instead of using a same run-length decoding manner for different attribute information, that is, a corresponding run-length decoding manner is adaptively selected based on distribution of attribute information at different bit rates, so that different run-length decoding manners can be used for different run-lengths, thereby effectively improving decoding efficiency.

The point cloud decoding apparatus provided in this embodiment of this application can implement the processes implemented in the method embodiment in FIG. 3, and a same technical effect is achieved. To avoid repetition, details are not described herein again.

Optionally, an embodiment of this application further provides a communication device (for a schematic structure of the communication device, reference may be made to FIG. 5), including a processor 501 and a memory 502, and the memory 502 stores a program or an instruction that can run on the processor 501. When the program or the instruction is executed by the processor 501, steps of the embodiment of the foregoing point cloud decoding method are implemented, and a same technical effect can be achieved. To avoid repetition, details are not described herein again.

An embodiment of this application further provides a point cloud decoding apparatus, including a processor and a communication interface. The processor is configured to: obtain a target parameter based on a target bitstream, where the target bitstream is obtained after encoding processing is performed on attribute information of target point cloud; determine a target run-length decoding manner based on the target parameter; and perform decoding processing on the target bitstream based on the target run-length decoding manner; where the target parameter includes at least one of the following: a target attribute information distribution characteristic value corresponding to a target bit rate point; and order information of target exponential Golomb encoding. This apparatus embodiment is corresponding to the embodiment of the foregoing point cloud decoding method. Each implementation process and implementation of the foregoing method embodiment may be applicable to this apparatus embodiment, and a same technical effect can be achieved.

An embodiment of this application further provides a point cloud decoding apparatus. For a schematic diagram of a hardware structure of the point cloud decoding apparatus, reference may be made to FIG. 6. The point cloud decoding apparatus includes but is not limited to at least some components in a radio frequency unit 601, a network module 602, an audio output unit 603, an input unit 604, a sensor 605, a display unit 606, a user input unit 607, an interface unit 608, a memory 609, a processor 610, and the like.

It may be understood by a person skilled in the art that the attribute inverse quantization apparatus may further include a power supply (such as a battery) that supplies power to each component. The power supply may be logically connected to the processor 610 by using a power management system, to implement functions such as charging, discharging, and power consumption management by using the power management system. The structure of the apparatus shown in FIG. 6 constitutes no limitation on the apparatus, and the apparatus may include more or fewer components than those shown in the figure, or combine some components, or have different component arrangements. Details are not described herein.

It should be understood that in this embodiment of this application, the input unit 604 may include a graphics processing unit (Graphics Processing Unit, GPU) 6041 and a microphone 6042. The graphics processing unit 6041 processes image data of a static picture or a video obtained by an image capture apparatus (for example, a camera) in a video capture mode or an image capture mode. The display unit 606 may include a display panel 6061. The display panel 6061 may be configured in a form such as a liquid crystal display or an organic light-emitting diode. The user input unit 607 includes at least one of a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein.

In this embodiment of this application, after receiving downlink data from a network side device, the radio frequency unit 601 may transmit the downlink data to the processor 610 for processing. In addition, the radio frequency unit 601 may send uplink data to the network side device. Generally, the radio frequency unit 601 includes but is not limited to an antenna, an amplifier, a transceiver, a coupler, a low noise amplifier, a duplexer, and the like.

The memory 609 may be configured to store a software program or an instruction and various data. The memory 609 may mainly include a first storage area for storing a program or an instruction and a second storage area for storing data. The first storage area may store an operating system, and an application or an instruction required by at least one function (for example, a sound playing function or an image playing function). In addition, the memory 609 may be a volatile memory or a non-volatile memory, or the memory 609 may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electri-cally EPROM, EEPROM), or a flash memory. The volatile memory may be a random access memory (Random Access Memory, RAM), a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 609 in this embodiment of this application includes but is not limited to these memories and any memory of another proper type.

The processor 610 may include one or more processing units. Optionally, an application processor and a modem processor are integrated into the processor 610. The application processor mainly processes an operating system, a user interface, an application, or the like. The modem processor mainly processes a wireless communication signal, for example, a baseband processor. It may be understood that the modem processor may alternatively not be integrated into the processor 610.

The processor 610 is configured to: obtain a target parameter based on a target bitstream, where the target bitstream is obtained after encoding processing is performed on attribute information of target point cloud; determine a target run-length decoding manner based on the target parameter; and perform decoding processing on the target bitstream based on the target run-length decoding manner; where the target parameter includes at least one of the following: a target attribute information distribution characteristic value corresponding to a target bit rate point; and order information of target exponential Golomb encoding.

Optionally, the processor 610 is further configured to perform at least one of the following:
in a case that the target attribute information distribution characteristic value is less than or equal to a first preset threshold, determining that the target run-length decoding manner is a first run-length decoding manner; and
in a case that the target attribute information distribution characteristic value is greater than the first preset threshold, determining that the target run-length decoding manner is a second run-length decoding manner.

Optionally, the processor 610 is further configured to perform at least one of the following:
in a case that an order of the target exponential Golomb encoding is less than or equal to a second preset threshold, determining that the target run-length decoding manner is a first run-length decoding manner; and
in a case that the order of the target exponential Golomb encoding is greater than the second preset threshold, determining that the target run-length decoding manner is a second run-length decoding manner.

Optionally, the processor 610 is further configured to:
in a case that a target decoding length corresponding to the target bitstream is greater than a third preset threshold, determine the target run-length decoding manner based on the target parameter.

The apparatus in this embodiment of this application obtains the target parameter based on the target bitstream, where the target parameter includes at least one of the target attribute information distribution characteristic value corresponding to the target code rate point or the order information of the target exponential Golomb encoding; the decoder determines the target run-length decoding manner based on the target parameter; and the decoder performs decoding processing on the target bitstream based on the target run-length decoding manner. In this way, the target run-length encoding manner is determined based on different target attribute information distribution characteristic values or order information of the target exponential Golomb encoding, instead of using a same run-length decoding manner for different attribute information, that is, a corresponding run-length decoding manner is adaptively selected based on distribution of attribute information at different bit rates, so that different run-length decoding manners can be used for different run-lengths, thereby effectively improving decoding efficiency.

An embodiment of this application further provides a readable storage medium. The readable storage medium stores a program or an instruction, and when the program or the instruction is executed by a processor, the processes of the foregoing embodiment of the point cloud encoding method or the point cloud decoding method, and a same technical effect can be achieved. To avoid repetition, details are not described herein again.

The processor is a processor in the apparatus in the foregoing embodiments. The readable storage medium includes a computer-readable storage medium, such as a computer read-only memory ROM, a random access memory RAM, a magnetic disk, or an optical disc.

An embodiment of this application further provides a chip. The chip includes a processor and a communication interface, the communication interface is coupled to the processor, and the processor is configured to run a program or an instruction to implement the processes of the foregoing embodiment of the point cloud encoding method or the point cloud decoding method, and a same technical effect can be achieved. To avoid repetition, details are not described herein again.

It should be understood that the chip mentioned in this embodiment of this application may also be referred to as a system-level chip, a system chip, a chip system, or a system on chip.

An embodiment of this application further provides a computer program product. The computer program product is stored in a storage medium, and the computer program product is executed by at least one processor to implement the processes of the foregoing embodiment of the point cloud encoding method or the point cloud decoding method, and a same technical effect can be achieved. To avoid repetition, details are not described herein again.

An embodiment of this application further provides a point cloud encoding and decoding system, including: a point cloud encoding apparatus or a point cloud decoding apparatus. The point cloud encoding apparatus may be configured to perform steps of the foregoing point cloud encoding method, and the point cloud decoding apparatus may be configured to perform steps of the foregoing point cloud decoding method.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. In absence of more constraints, an element preceded by a statement "includes a . . . " does not preclude the presence of additional identical elements in the process, method, article, or apparatus that includes the element. In addition, it should be noted that the scope of the method and apparatus in the implementations of this application is not limited to performing functions in an illustrated or discussed sequence, and may further include performing the functions in a basically simultaneous manner or in a reverse sequence based on the functions concerned. For example, the described method may be performed in an order different from the described order, and steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (for example, a ROM/RAM, a floppy disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific implementations. The foregoing specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. A point cloud encoding method, comprising:
    determining, by an encoder based on attribute information of target point cloud, a target attribute information distribution characteristic value corresponding to a target bit rate point, wherein the target bit rate point is a bit rate point corresponding to an attribute quantization step of the attribute information;
    determining, by the encoder, a target run-length encoding manner based on the target attribute information distribution characteristic value; and
    performing, by the encoder, encoding processing on the attribute information based on the target run-length encoding manner;
    wherein the determining, by the encoder, a target run-length encoding manner based on the target attribute information distribution characteristic value comprises:
    determining, by the encoder, order information of target exponential Golomb encoding based on the target attribute information distribution characteristic value; and
    determining the target run-length encoding manner based on the order information of the target exponential Golomb encoding.

2. The method according to claim 1, wherein the determining, by an encoder based on attribute information of target point cloud, a target attribute information distribution characteristic value corresponding to a target bit rate point comprises:
    determining, by the encoder, a distribution characteristic value of the attribute information of the target point cloud; and determining, by the encoder based on the distribution characteristic value of the attribute information, the target attribute information distribution characteristic value corresponding to the target bit rate point.

3. The method according to claim 2, wherein the determining, by the encoder, a distribution characteristic value of the attribute information of the target point cloud comprises:
   obtaining, by the encoder, a maximum value and a minimum value of target attribute information, wherein the target attribute information is attribute information of a point cloud subset of the target point cloud, or is the attribute information of the target point cloud; and
   determining, by the encoder, the distribution characteristic value of the attribute information of the target point cloud based on the maximum value and the minimum value of the attribute information of the point cloud subset.

4. The method according to claim 3, wherein the distribution characteristic value of the attribute information of the target point cloud meets the following formula:

$disAttr = Attrmin_{max}$, wherein disAttr represents the distribution characteristic value of the attribute information of the target point cloud, $Attr_{max}$ represents a maximum value of the attribute information, and $Attr_{min}$ represents a minimum value of the attribute information.

5. The method according to claim 2, wherein the determining, by the encoder, a distribution characteristic value of the attribute information of the target point cloud comprises:
   obtaining, by the encoder, an average value of absolute values of the attribute information of the target point cloud; and
   determining, by the encoder, the distribution characteristic value of the attribute information of the target point cloud based on the average value.

6. The method according to claim 2, wherein the target attribute information distribution characteristic value meets the following formula:

$$disAttr' = \frac{disAttr}{AttrQuantStep},$$

wherein
   disAttr represents the distribution characteristic value of the attribute information of the target point cloud, AttrQuantStep represents an attribute quantization step of the attribute information, and disAttr' represents the target attribute information distribution characteristic value.

7. The method according to claim 1, wherein an order of the target exponential Golomb encoding is positively correlated with the target attribute information distribution characteristic value; or
   an order of the target exponential Golomb encoding meets the following formula:

$Index = \log_2 d$ isAttr', wherein disAttr' represents the target attribute information distribution characteristic value, Index represents an index of the order of the target exponential Golomb encoding, and the index of the order of the target exponential Golomb encoding is in one-to-one correspondence with the order of the target exponential Golomb encoding.

8. The method according to claim 1, wherein the determining, by the encoder, the target run-length encoding manner based on the order information of the target exponential Golomb encoding comprises at least one of the following:
   in a case that an order of the target exponential Golomb encoding is less than or equal to a second preset threshold, determining, by the encoder, that the target run-length encoding manner is a first run-length encoding manner; and
   in a case that the order of the target exponential Golomb encoding is greater than the second preset threshold, determining, by the encoder, that the target run-length encoding manner is a second run-length encoding manner.

9. The method according to claim 1, wherein the determining, by the encoder, a target run-length encoding manner based on the target attribute information distribution characteristic value comprises:
   in a case that a target encoding length corresponding to the target point cloud is greater than a third preset threshold, determining, by the encoder, the target run-length encoding manner based on the target attribute information distribution characteristic value.

10. The method according to claim 8, wherein the first run-length encoding manner is an Nth-order exponential Golomb encoding manner, and N is greater than or equal to 0; and
    the second run-length encoding manner is an arithmetic encoding manner.

11. A point cloud decoding method, comprising:
    obtaining, by a decoder, a target parameter based on a target bitstream, wherein the target bitstream is obtained after encoding processing is performed on attribute information of target point cloud;
    determining, by the decoder, a target run-length decoding manner based on the target parameter; and
    performing, by the decoder, decoding processing on the target bitstream based on the target run-length decoding manner; wherein
    the target parameter comprises:
    order information of target exponential Golomb encoding.

12. The method according to claim 11, wherein the determining, by the decoder, a target run-length decoding manner based on the target parameter comprises at least one of the following:
    in a case that an order of the target exponential Golomb encoding is less than or equal to a second preset threshold, determining, by the decoder, that the target run-length decoding manner is a first run-length decoding manner; and
    in a case that the order of the target exponential Golomb encoding is greater than the second preset threshold, determining, by the decoder, that the target run-length decoding manner is a second run-length decoding manner.

13. The method according to claim 11, wherein the determining, by the decoder, a target run-length decoding manner based on the target parameter comprises:
    in a case that a target decoding length corresponding to the target bitstream is greater than a third preset threshold, determining, by the decoder, the target run-length decoding manner based on the target parameter.

14. The method according to claim 12, wherein the first run-length decoding manner is an Nth-order Golomb decoding manner, and N is greater than or equal to 0; and
    the second run-length decoding manner is a bit-by-bit decoding manner.

15. A communication device, comprising a processor and a memory, wherein the memory stores a program or an instruction that can run on the processor, and when the program or the instruction is executed by the processor, steps of a point cloud decoding method are implemented, the point cloud decoding method comprising:
  obtaining, by a decoder, a target parameter based on a target bitstream, wherein the target bitstream is obtained after encoding processing is performed on attribute information of target point cloud;
  determining, by the decoder, a target run-length decoding manner based on the target parameter; and
  performing, by the decoder, decoding processing on the target bitstream based on the target run-length decoding manner; wherein
  the target parameter comprises:
  order information of target exponential Golomb encoding.

16. The communication device according to claim 15, wherein the determining, by the decoder, a target run-length decoding manner based on the target parameter comprises at least one of the following:

in a case that an order of the target exponential Golomb encoding is less than or equal to a second preset threshold, determining, by the decoder, that the target run-length decoding manner is a first run-length decoding manner; and in a case that the order of the target exponential Golomb encoding is greater than the second preset threshold, determining, by the decoder, that the target run-length decoding manner is a second run-length decoding manner.

17. A communication device, comprising a processor and a memory, wherein the memory stores a program or an instruction that can run on the processor, and when the program or the instruction is executed by the processor, steps of the point cloud encoding method according to claim 1 are implemented.

\* \* \* \* \*